Figure 1:
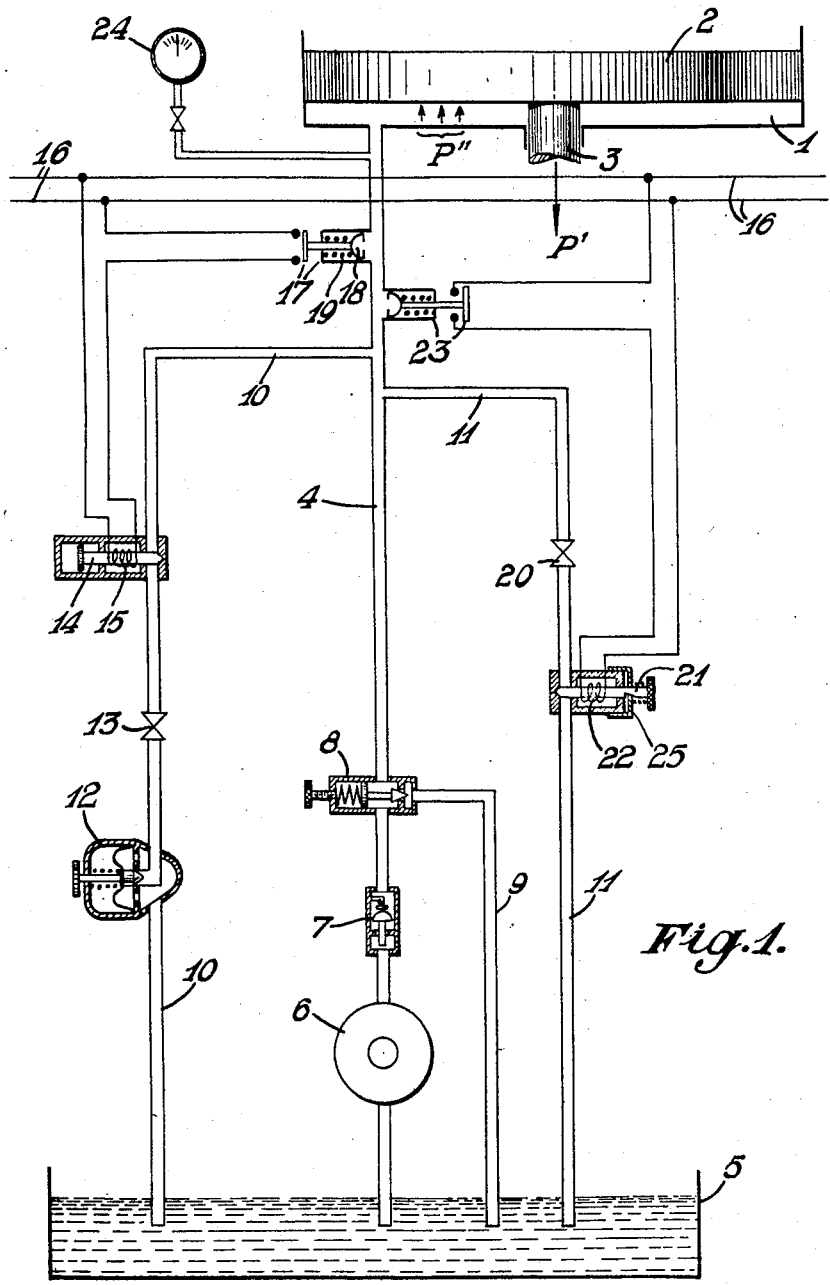

Sept. 29, 1959        E. LAVERDISSE        2,906,066
APPARATUS FOR VERTICALLY ACTUATING THE TOOLS OF
MACHINES FOR GRINDING AND/OR POLISHING GLASS
Filed June 4, 1957        2 Sheets-Sheet 1

United States Patent Office 2,906,066
Patented Sept. 29, 1959

2,906,066

APPARATUS FOR VERTICALLY ACTUATING THE TOOLS OF MACHINES FOR GRINDING AND/OR POLISHING GLASS

Edmond Laverdisse, Auvelais, Belgium, assignor to Les Glaceries de la Sambre, Societe Anonyme, Auvelais, Belgium, a Belgian company Application June 4, 1957, Serial No. 663,541

Claims priority, application Belgium June 13, 1956

4 Claims. (Cl. 51—165)

The present invention relates to a method and apparatus for the vertical actuation, i.e. for the control of the upward and downward movements:

Of the cross members supporting the upper tools of machines for the simultaneous grinding and/or polishing of the two faces of a continuous sheet of glass (for example according to U.S. Patent No. 2,774,196 of December 18, 1956), Of the upper tools of machines for the simultaneous grinding and/or polishing of the two faces of a continuous sheet of glass, which machines comprise one or more upper tools not connected together by a movable cross member, and Of the tools of grinding and/or polishing machines working glass on a table, i.e. glass in a discontinuous sheet worked on one face at a time.

The invention concerns more especially the adjustment of the working pressure of the upper tools, the hydraulic control of the upward or downward movement of the movable equipment of the upper tools, and safety in the event of disappearance of the glass from the working zone, which might result in the upper and lower tools coming into contact with one another.

The movement of the movable equipment is effected by means of at least one piston sliding in a cylinder fast with the beam of the machine, the said cylinder being fed with a liquid or fluid (generally oil) under variable pressure.

Considered from its broadest aspect, the present invention consists in utilising for raising the upper tool or tools the pressure increase of the fluid in the supporting cylinder or cylinders on disappearance of the glass sheet under the tools in question.

Given the weight P' of the movable equipment (tools, shafts, cross-members and control members) acting downwards, P" the pressure of the liquid on the piston, acting upwards, and P''' the difference between these two pressures, applied to the glass, the invention has for its object to provide a method having the following main feature:

The liquid is introduced into the cylinder at a pressure P" higher than P'; this liquid is allowed to escape through a passage adjusted in such manner that, in operation, the pressure P" is automatically maintained at a value such that the difference $P'-P''=P'''$ is equal to the chosen operating pressure of the tools; means are provided for the automatic closing of the said discharge passage and consequently an increase in the pressure P" above the pressure P' and, therefore, the removal of the upper tools from their operating position when the pressure difference P''' becomes greater than the operating pressure previously adopted.

The method according to the invention has in addition the following features which may be combined with the main feature:

The removal of the upper tools from their operating position may be effected at any instant by closing the said discharge passage independently of the automatic closing.

The said discharge passage remaining closed and the pressure P" consequently being higher than the pressure P', the upper tools are maintained in a position away from their operating position. In order to return them progressively into the operating position, two discharge paths are offered to the liquid under pressure. The first, which is the one hereinbefore referred to and which is open so as to ensure the chosen operating pressure during operation, produces a slow downward movement. The second discharge passage, which is momentarily opened, produces the rapid descent of the tools, but its automatic closing is effected when the pressure P" falls to a value below that chosen for the normal operation, in order to prevent any excessive pressure on the glass.

The invention further relates to various devices for carrying out the aforesaid method.

Figure 2:
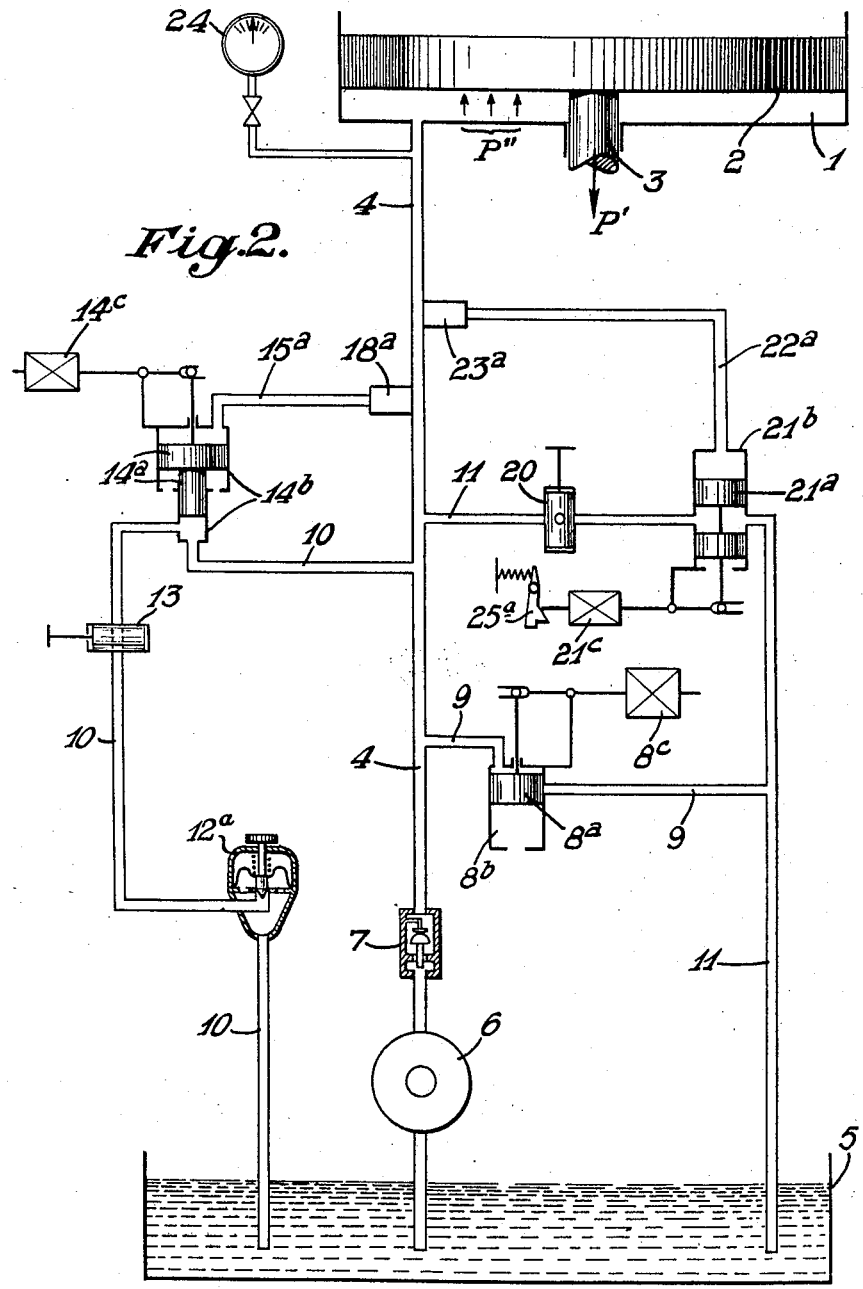

Two constructional forms of devices according to the invention are illustrated by way of example in the accompanying drawings, in which:

Figure 1 shows a hydraulically, electromechanically and mechanically controlled device, and Figure 2 shows a hydraulically and mechanically controlled device.

According to Figure 1, the device comprises the cylinder 1 fixed to the beam (not shown) of a glass grinding and/or polishing machine, the said cylinder containing the piston 2, the rod 3 of which supports the cross member supporting the upper tools (not shown). Connected to the cylinder 1 is the delivery duct 4 of a pump 6 fed from an oil reservoir 5. The said duct 4 comprises a non-return valve 7 and an adjustable safety valve 8 opening into a return duct 9 which in turn leads to the oil reservoir 5.

The delivery duct 4 is also connected to a return duct 10 and to another return duct 11, both of which lead to the oil reservoir 5.

The return duct 10 comprises a manually adjustable shut-off valve 12, for example of the type comprising a needle and an adjustable pressure diaphragm serving to determine the cross-sectional throughflow area of the return duct 10, a manually operable cock 13, and an electromagnet valve 14 having an electromagnetic control means 15 fed by the supply system 16 and controlled by the pressure detector 17 of any appropriate design (for example of the type comprising a piston 18 and an opposing spring 19 or a diaphragm) connected to the delivery duct 4.

The return duct 11 is provided with a manually operable cock 20, and a minimum electromagnet valve 21 having an electromagnetic control 22 fed by the supply system 16 and controlled by the pressure detector 23, which is identical to the pressure detector 17 and is also connected to the delivery duct 4 and operates at a minimum value.

The latter is also provided with a pressure gauge 24.

The operation of the device according to Figure 1 is as follows:

A. Adjustment

It will be assumed that P' is the downward pressure of the movable equipment, P" is the upward pressure of the oil at 4 and $P'''=P'-P''$ is the working pressure on the glass.

The safety valve 8 is adjusted to open at a pressure higher than the pressure P" by which the movable equipment is raised, for example at a pressure of 9 kg./cm².

If the delivery pressure of the pump 6 accidentally becomes insufficient, the non-return valve 7 closes automatically under the action of the return of the oil towards the pump 6.

The shut-off valve 12 is adjusted for an operating pressure of P''', for example a pressure of 6.5 to 6 kg./cm.².

The electromagnetic valve 14 to 19 is so adjusted as to close automatically when the pressure in 4 is slightly higher than the pressure P'' fixed to determine the working pressure, for example at a pressure of 7 kg./cm.². This automatic closing is effected by means of the pressure detector 17.

Similarly, the electromagnetic valve 21 to 23 is so adjusted as to close automatically when the pressure in 4 becomes slightly lower than the pressure P'' previously fixed, for example at a pressure of 5.5 kg./cm.².

Thus, the electromagnetic valve 14 closes the oil circuit at 10 at a pressure of 7 kg./cm.² and opens it at a pressure lower than the latter pressure, while the electromagnetic valve 21 closes the oil circuit at 11 at a pressure of 5.5 kg./cm.² and opens it at a pressure above this pressure, after manual release of the locking means hereinafter referred to.

B. *Manipulations*

The tools being assumed to be in operation, the cock 20 is closed and the cock 13 is opened. The shut-off valve 12 is adjusted to guarantee an operating pressure P''' of 6.5 to 6 kg./cm.².

In order to stop the operation, the cock 13 is closed. Consequently, the pressure within the cylinder rises, the electromagnetic valve 14 to 19 closes, and the piston 2 rises together with the tools. It is to be noted that during this time the cock 20 remains closed, while the electromagnetic valve 21 to 23 remains open.

In order to resume working, the cock 20 is opened. Since the flow through the duct 11 is thus freed, the downward movement of the tools takes place rapidly. When the pressure at 4 has fallen to 7 kg./cm.², the electromagnetic valve 14 to 19 opens and re-sets in operation that portion of the return duct 10 which is provided with the pressure regulating valve 12.

At this instant, the cock 20 is closed, and the tools, descending slowly, come into contact with the glass.

During the downward movement of the movable equipment, excessive pressure on the glass is avoided by closing the cock 20 by hand before the pressure in the cylinder has fallen too far.

This manual operation is associated with the operation of the minimum electromagnetic valves 21—22, which automatically performs the same function as the cock 20. In order to avoid pumping, that is to say, automatic successive opening and closing of the device 21—23, the operation of the latter is automatic only in the closing direction, while opening thereof must be effected by hand by disengaging the locking device 25 hereinbefore referred to.

Once the tools have come into contact with the glass, the pressure at 4, indicated by the pressure gauge 24, falls suddenly and the electromagnetic valve 21—23 closes automatically. At this instant, the cock 20 is closed.

C. *Safety*

(a) If, by inadvertence, the cock 20 is not closed, the valve 21—23 automatically cuts off the discharge of the liquid through the duct 11 at the instant when the pressure therein falls to 5.5 kg./cm.² (see above). Consequently, any excessive working pressure is avoided.

(b) If, during operation, the glass disappears from the zone in which the tools are applied, the equilibrium expressed by the equation $P''' = P' - P''$ is destroyed. In fact, in this case $P''' = 0$ and $P'' = P'$, which means that the total weight of the upper movable equipment is applied to the liquid at 4, 10, 11 on the upstream side at 14—19 and of 20—23. This sudden rise of P'' to the value of P' produces the instantaneous closing of the electromagnetic valve 14 to 19, so that P'' becomes higher than P', the upper movable equipment rises again and contact of the upper tools with the lower tools is thus avoided. As soon as the upper movable equipment meets its upper travel-limiting abutment, the pressure below the piston 2 rises to the maximum determined by the adjustment of the safety valve 8 (9 kg./cm.²; see above).

Finally, if during the downward movement of the movable equipment of the upper tools the cock 20 is left open for too long a time, the tools are prevented from encountering the glass too violently in the manner hereinbefore described, that is to say, by reason of the fact that the valve 21 to 23 automatically cuts off the discharge of the liquid through the duct 11 at the instant when the pressure therein falls to 5.5 kg./cm.².

It is to be noted that the subject of the present invention may be used either separately or in combination with the subject of U.S. Patent No. 2,774,196, whereby the controls are rendered more flexible and the safety of operation is increased.

Figure 2 illustrates by way of example a second embodiment of the invention which is similar to that of Figure 1, but in which use is made of valves controlled by a combination of hydraulic means and adjustable rocking counterweights. The reference numerals employed in the two figures are the same. Those designating elements of like function but of different construction are completed by the indices a, b and c.

Thus, there will be seen the cylinder 1, the piston 2 and its rod 3, the delivery duct 4, the oil reservoir 5, the pump 6, the non-return valve 7, the return ducts 9, 10 and 11 and the cocks 13 and 20.

There will also be seen the safety valve consisting of a piston 8a slidable in a cylinder 8b and controlled by the combined action of an adjustable rocking counterweight 8c and of the hydraulic pressure in the upstream part of the return duct 9, connected to the delivery duct 4 and to the cylinder 8b. The piston 12a slidable in the cylinder 12b and controlled by the combined action of an adjustable rocking counterweight 12c and of the hydraulic pressure in the upstream part of the return duct 10 connected to 4 and to the cylinder 12b; the stepped piston 14a slidable in the stepped cylinder 14b and controlled by the combined action of an adjustable rocking counterweight 14c and of the hydraulic pressure in the pressure tapping duct 15a, 18a; the piston 21a slidable in the cylinder 21b and controlled by the combined action of an adjustable rocking counterweight 21c comprising a retaining pawl 25a and of the hydraulic pressure in the pressure tapping duct 22a, 23a.

The operation of this device is substantially the same as that according to the device of Figure 1. There is only one difference, which consists in that the sliding piston 12a automatically closes the return duct 10 if the pressure in the upstream part of the latter falls below the value for which the counterweight 12c is set.

It is obvious that in the embodiment hereinbefore described the electromagnetic or counterweight control devices may be replaced by, or combined with, adjustable calibrated springs, and that generally speaking the closure devices employed in accordance with the invention may, without department from the scope of the latter, be of any appropriate type and be controlled by any appropriate means of mechanical, hydraulic, pneumatic, electric, electromagnetic, electronic, etc. or mixed form.

I claim:

1. A control device for a working tool of a glass grinding machine wherein the tool is supported by a piston accommodated in a cylinder; said device comprising a delivery duct coupled to the cylinder for the delivery of a pressure medium thereto, a discharge duct coupled to said delivery duct, a control valve in said discharge duct, means coupled to the control valve and coupled to and responsive to the pressure in said delivery duct for selectively opening and closing said valve to control discharge of the pressure medium, a limit valve in said discharge duct on the discharge side of the control valve and directly responsive to a predetermined pressure in the discharge duct for opening and enabling the discharge of the medium, and a manually controlled valve in the discharge duct for opening and closing the same.

2. A device as claimed in claim 1 comprising a second discharge duct coupled to said delivery duct, a manually controlled valve in the second discharge duct, and a pressure-responsive valve in the second discharge duct for closing automatically when the pressure in the delivery duct falls below a predetermined valve.

3. A device as claimed in claim 1, wherein said control valve is an electromagnetic device and said means is a pressure responsive switch, comprising a power source coupled by said switch to said electromagnetic device.

4. A device as claimed in claim 1 wherein said control valve comprises a stepped piston responsive to said means, and an adjustable counterbalancing weight coupled to the piston to adjust the reaction of the same.

References Cited in the file of this patent

UNITED STATES PATENTS

| | | |
|---|---|---|
| 2,308,976 | Indge | Jan. 9, 1943 |
| 2,690,034 | Laverdisse | Sept. 28, 1954 |

FOREIGN PATENTS

| | | |
|---|---|---|
| 1,065,623 | France | Jan. 13, 1954 |